(12) United States Patent
Comes et al.

(10) Patent No.: US 6,327,809 B1
(45) Date of Patent: Dec. 11, 2001

(54) ARTICLE SECURING SYSTEM

(76) Inventors: Joseph P. Comes, 2425 Rocks Rd.;
Edward E. Comes, 2423 Rocks Rd.,
both of Forest Hill, MD (US) 21050

( * ) Notice: Subject to any disclaimer, the term of this patent is extended or adjusted under 35 U.S.C. 154(b) by 0 days.

(21) Appl. No.: 09/391,486

(22) Filed: Sep. 8, 1999

(51) Int. Cl.⁷ .................................................. A01M 23/34
(52) U.S. Cl. ........................ 43/87; 43/86; 43/85; 43/61
(58) Field of Search .............................. 43/61, 86, 57.2, 43/87, 15, 78, 42.09, 42.22, 42.23; 24/16, 17; 606/47

(56) References Cited

U.S. PATENT DOCUMENTS

| | | |
|---|---|---|
| 2,982,049 | 5/1961 | Yost . |
| 3,197,912 | 8/1965 | Kramer . |
| 3,760,468 | 9/1973 | Linville . |
| 4,208,827 * | 6/1980 | Starkley .................................. 43/87 |
| 4,216,607 | 8/1980 | Lyster . |
| 4,229,901 | 10/1980 | Flowers et al. . |
| 4,307,532 | 12/1981 | Hughs . |
| 4,538,376 | 9/1985 | Morton . |
| 5,171,233 | 12/1992 | Amplatz et al. . |
| 5,174,059 | 12/1992 | Durbin . |
| 5,331,762 * | 7/1994 | Banks .................................. 43/42.09 |
| 5,333,407 | 8/1994 | Merritt . |
| 5,353,541 | 10/1994 | Jonason et al. . |
| 5,640,800 | 6/1997 | Peterson . |
| 5,797,167 * | 8/1998 | Schwab .................................. 24/16 |
| 5,906,621 | 5/1999 | Secrest et al. . |
| 6,152,922 * | 11/2000 | Ouchi .................................. 606/47 |

* cited by examiner

Primary Examiner—Peter M. Poon
Assistant Examiner—Floris C Copier
(74) Attorney, Agent, or Firm—Rosenberg, Klein & Lee

(57) ABSTRACT

There is provided a system (10) for releasably securing an article to a frame structure (2). The system (10) generally comprises a collar member (200) secured to the frame structure (2) and a snare member (100) coupled to collar member (200). Collar member (200) is configured to substantially define a hoop. Snare member (100) includes a collapsible loop portion (110) displaceably captured by collar member (200) to pass through the hoop defined thereby, and an engagement portion (120) coupled to loop portion (110) for releasably engaging the frame structure (2). Loop portion (110) is operatively drawn to collapse about and constrict the article responsive to sufficient displacement of at least a portion of snare member (100) relative to collar member (200).

20 Claims, 3 Drawing Sheets

ARTICLE SECURING SYSTEM

BACKGROUND OF THE INVENTION

FIELD OF THE INVENTION

The subject article securing system is generally directed to a system for releasably securing an article to remain within or in close proximity to a frame structure. More specifically, the subject article securing system is one which may be conveniently coupled to a given frame structure and simply operated to constrictively engage an article in secure manner.

In various applications, it is desirable to quickly and conveniently secure an article to remain within, or at least in close proximity, to a frame structure. One such application is found in the context of creature entrapment. In that context, the article comprises bait or other items for luring a particular creature into a trap structure before that structure's trap mechanism is sprung. Ideally, the bait item is secured within the trap structure, though in a readily accessible manner, such that the creature may not exit the structure with it.

To effectively serve its luring function, the bait item must be retained in such manner that it remains highly visible and freely accessible to the creature being sought. The retention must be secure enough to withstand the onslaught of a hungry and, perhaps, frustrated creature without loosening or breaking. If not, the bait item may fail to appear sufficiently enticing to the creature in question, or may be too easily dislodged and removed from the trap structure. The entrapment capability would be compromised severely in either case.

In specific applications such as crabbing, for example, a wire cage frame structure is submerged and maintained within a body of water with its trap doors positioned to permit open access by a crab. Placed within the frame structure is a bait item such as a chicken part, small fish, or the like. When a crab, having been lured by the bait item, enters the frame structure to snatch and consume it, the user actuates the trap mechanism accordingly to promptly shut the trap doors and withdraw the occupied cage.

Where a user vigilantly monitors a particular trap structure in order to immediately actuate the entrapping mechanism upon sensing the slightest disturbance potentially indicative of a crab's entry into the structure, the most rudimentary means for securing the bait item within the cage structure may be tolerable. It is seldom, if ever, practicable to maintain for any one trap structure the level of focus and continuous attention this requires. The ability of even the most careful user to discern legitimate disturbances caused by a crab's actual entry into the cage structure is invariably impeded by the occurrence of erroneous disturbances due to such factors as changes of current in the surrounding waters or contact with underwater vegetation and debris. As a practical matter, then, one's ability to manually actuate the entrapment mechanism at timely moments is necessarily limited in reliability.

The trap structure is typically operated, therefore, in the following manner. The cage structure is lowered into the water and set at the bottom surface with its trap doors resting in the open position. Prior to thus deploying the cage structure, the bait item is placed within the cage structure and tied, or otherwise secured, to the structure's cross members. Rather than relying upon a sensed cage disturbance to actuate the entrapment mechanism, the user then periodically springs the trap mechanism and draws the cage structure out of the water, hoping that a crab has entered the cage in the time since check of that cage was last made. In commercial or other high volume applications, a plurality of cage structures may be concurrently deployed and sequentially checked.

This process relies upon a crab's entering a given cage structure and remaining inside for a substantial period of time—consuming the bait item—while the operator's next check of the cage remains pending. Hence, it is imperative that the bait items be retained securely within the cage structure. Otherwise, crabs may very well remove the bait items, as well as themselves, from the cage structures before their trap mechanism's are sprung. It is also imperative, especially where more than a few cage structures are concurrently utilized, that the means for securing the bait items thereto be as quickly and conveniently operable as it is strongly and securely retentive. Otherwise, the time period between successive checks of each cage structure may be unduly delayed by the additional effort required of the user to replace a consumed or spent bait item. Also, the tedium and delay intrinsic to repeatedly re-baiting the plurality of cage structures would heighten the risk of careless error. There is, therefore, a need in this and other applications for an article securing system adapted to retain the article in highly secure manner, yet remain quickly and conveniently operable.

PRIOR ART

Devices for securing an article to a particular structure are known in the art. The best prior art known to Applicants include: U.S. Pat. Nos. 5,906,621; 4,216,607; 5,174,059; 5,640,800; 5,353,541; 4,229,901; 4,538,376; 5,171,233; 3,760,468; 5,333,407; 4,307,532; 2,982,049; and, 3,197,912. The devices known in the art, however, fail to disclose a system for securing an article to a frame structure possessing the combination of effective operation, simple structure, and convenient utility found in the subject article securing system.

For example, one device known in the art is a bracket-like bait holder device that secures to the cage frame of a trap structure. When deployed, the device effectively forms about a bait item a rigid, cage-like structure. While this serves well to prevent the bait item's removal from the cage, it significantly obstructs the bait item's accessibility to a potential catch. A crab lured by the bait item into the cage may become frustrated by its inability to freely manipulate and consume that bait item, and may therefore exit the cage earlier than it otherwise would were its access to the bait item not so restricted.

Other practical drawbacks are inherent in such bait holders. The substantial structure enclosing the bait item may so obstruct the item that a creature of interest may fail in the first place to detect or identify it as an attractive food item. In addition, such bait holders are typically of substantial structure and cannot be securely affixed to the cage without securing means of comparably substantial structure. Consequently, installing and removing them constitute much more than trivial tasks.

In contrast to these and other types of article-holding devices and systems known in the art, the subject article securing system retains an article in highly accessible, and readily manipulable, manner. It does so while maintaining a high level of strength and security in the retention. The system also permits quick and convenient installation and subsequent placement/replacement of the article being secured.

SUMMARY OF THE INVENTION

It is thus a primary object of the present invention to provide an article securing system which reliably retains the article within or in close proximity to a frame structure to which it is coupled.

It is another object of the present invention to provide an article securing system that may be quickly and conveniently operated to secure or release the article.

It is yet another object of the present invention to provide an article securing system that may be quickly and conveniently operated to constrictively engage the article.

It is still another object of the present invention to provide an article securing system which may be quickly and conveniently coupled to a given frame structure for operation.

These and other objects are attained in the subject system and method for releasably securing an article to a frame structure. The system generally comprises a collar member secured to the frame structure and a snare member coupled to the collar member. The collar member is configured to substantially define a hoop. The snare member includes a collapsible loop portion displaceably captured by the collar member to pass through the hoop defined thereby, and an engagement portion coupled to the loop portion for releasably engaging the frame structure. The snare member's loop portion is operatively drawn to collapse about and constrict the article responsive to sufficient displacement of at least a portion of the snare member relative to the collar member.

In one embodiment of the system, the engagement portion of the snare member is resiliently coupled to the loop portion thereof. The loop portion, in one embodiment, is formed of a flexible yet substantially inelastic material. The system, in one embodiment, also comprises a catch member coupled to the snare member's loop portion for impeding the release thereof from its coupling with the collar member. The catch member preferably includes a ring portion engaging the snare member's loop portion, wherein the ring portion is formed with an outer diametric dimension greater than a maximum inner diametric dimension of the hoop substantially defined by the collar member. The snare member's engagement portion preferably includes an end having a hook formed therein.

DETAILED DESCRIPTION OF THE PREFERRED EMBODIMENTS

Figure 1:
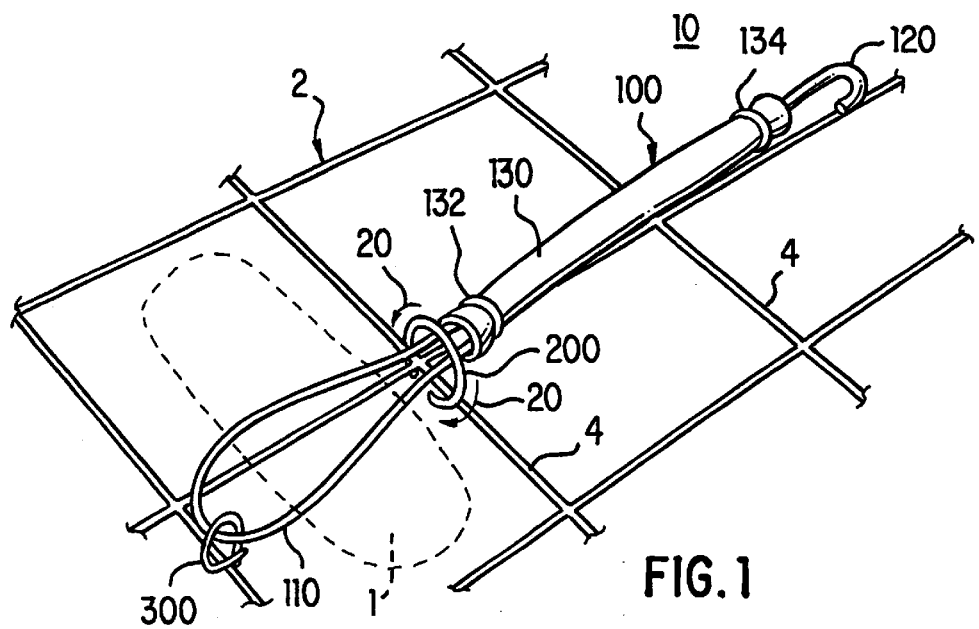
FIG. 1 is a perspective view, partially cut-away, of one embodiment of the present invention in preparation for operation with a frame structure.

Turning now to FIG. 1, there is shown an embodiment of the subject system 10 for releasably securing an article 1 to a frame structure 2. System 10 generally includes a snare member 100 that may be coupled to the frame structure 2 by a collar member 200. Snare member 100 is formed with an engagement portion 120 coupled to a collapsible loop portion 110, preferably in resilient manner, by a resilient bias portion 130 extending therebetween. The coupling of bias portion 130 to loop and engagement portions 110, 120 at its opposed ends may be reinforced by clamps or any other suitable fastening means, 132, 134.

Preferably, engagement portion 120 is formed with a hook configuration so as to be readily engageable and disengageable with a cross member 4 of the frame structure 2; and, bias portion 130 is formed of an elastic material, such as a dense rubber, of suitable material properties to withstand repeated and extended exposure to the environmental conditions of the intended application. Loop portion 110 is preferably formed of a flexible yet substantially inelastic material of high strength, abrasion resistance and durability such as dense plastics, fiberglass, nylon, or other comparable materials known in the art. While the choice of particular material composition is not important to the present invention, it is important that loop portion 110 remain sufficiently collapsible such that it may be drawn to constrictively engage and thereby captively retain the article 1 despite tenacious forces and abrasive blows that a creature may impart thereto in an effort to free the article 1 from this captive engagement. In the embodiment shown, a monofilament material treated to resist premature hardening and decay is employed.

Snare member 100 is installed for operation on frame structure 2 by securing it, by use of a collar member 200, to a cross member 4 or some other accessible component of frame structure 2. To preserve simplicity and speed of installation, collar member 200 is preferably formed integrally of a malleable yet suitably strong and durable material such as steel and the like. Preferably, it is initially configured with an open ring configuration. When snare member 100 is to be installed, it is positioned as shown about that snare member 100 and a cross member 4 of the frame structure 2. It is then crimped (or otherwise manipulated) by the operator using a pair of pliers (not shown) or other suitable implement, if necessary, as indicated by the directional arrows 20. Collar member 200 is thus malleably configured such that its free ends are either crossed or drawn close enough to one another to define, substantially, a hoop that captively retains portions of both the secured frame structure 2 and snare member 100. The hoop thus defined by collar member 200 is configured with a sufficiently great diametric dimension, however, that at least the loop portion 110 of snare member 100 remains axially displaceable therethrough.

Collar member 200 may be implemented by other suitable means, so long as it permits comparably quick and convenient installation of snare member 100 for proper operation thereafter. The present invention is not limited to any particular form or configuration.

Figure 3:
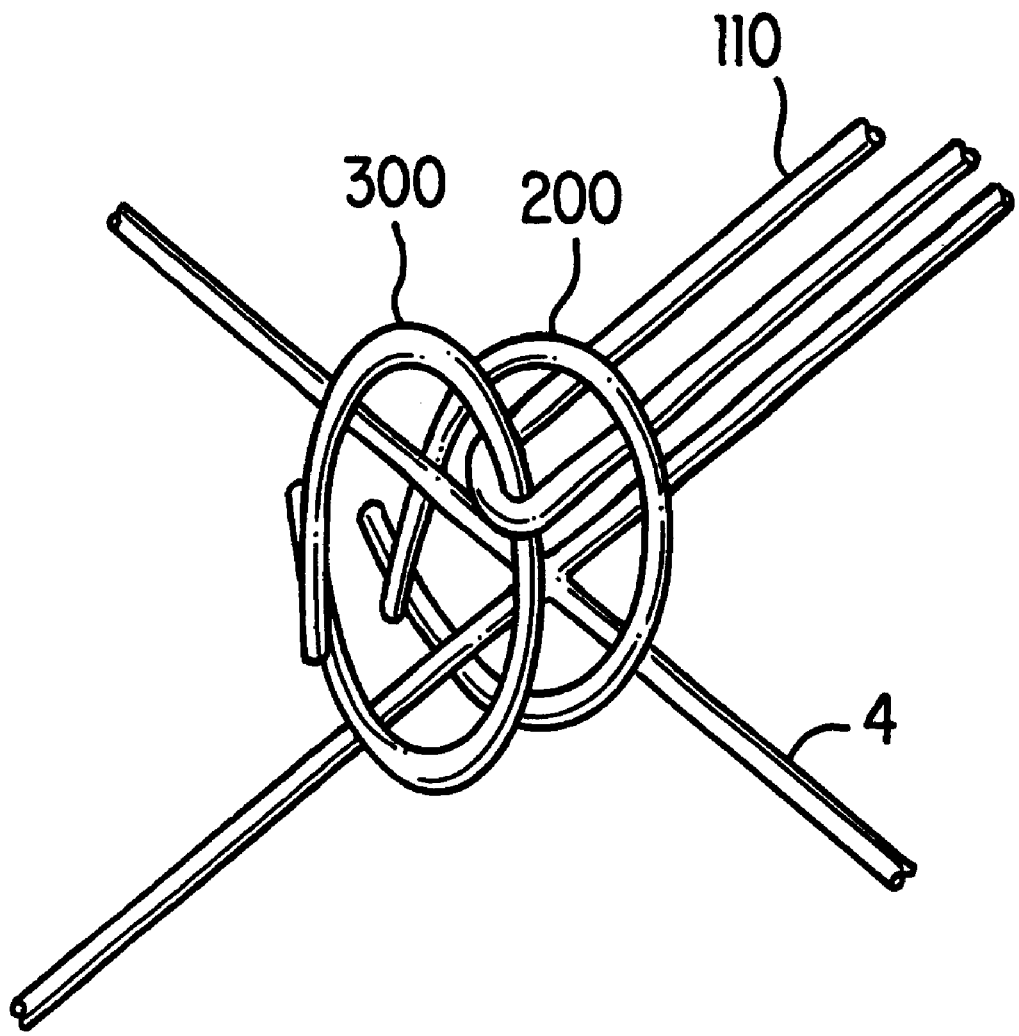
FIG. 3 is a detailed perspective view, partially cut-away, of the embodiment of the present invention shown in FIG. 1 illustrating the interaction of particular members thereof; and, FIG. 4 is a perspective view, illustrating the operation in an exemplary application of the embodiment of the present invention shown in FIG. 1.

During use, loop portion 110 engages the given article 1 and, therefore, is stopped by that article 1 from being completely drawn through and out of engagement with collar member 200 when engagement portion 120 is accordingly displaced. Given that it may otherwise pass freely through collar member 200 were article 1 not present, however, a catch member 300 is preferably employed. Catch member 300 may be realized in any suitable manner, though it includes in the embodiment shown a malleable member conveniently coupled to loop portion 110 by crimping at least a portion thereof to a ring configuration. The specific attributes of catch member 300 are important only to the extent that they enable it to impede the release of loop portion 110 through and from collar member 200, as shown in FIG. 3. Consequently, its outer diametric dimension must remain greater than the maximum inner diametric dimension of the hoop substantially defined by collar member 200.

Figure 2:
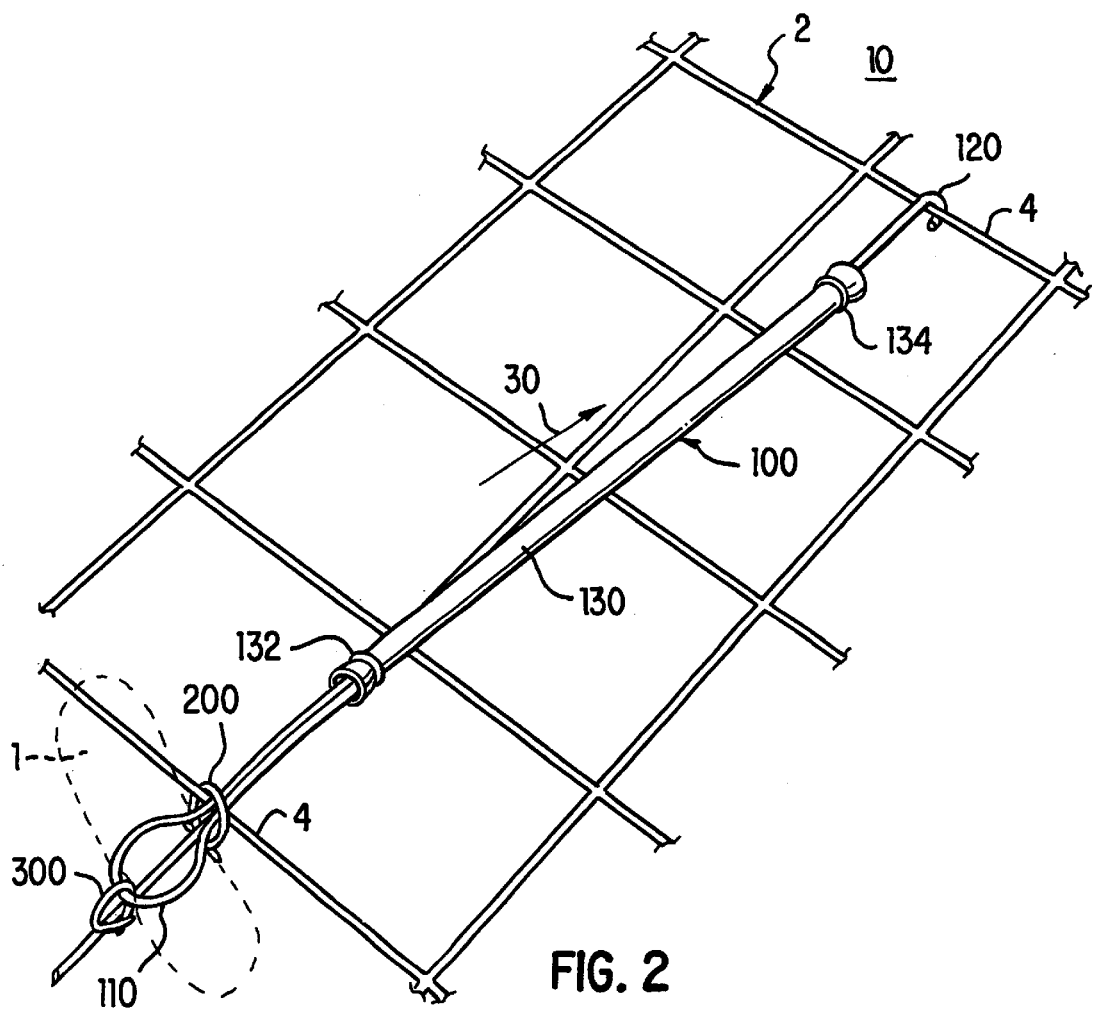
FIG. 2 is a perspective view, partially cut-away, of the embodiment of the present invention shown in FIG. 1 during exemplary operation with the frame structure.

Turning next to FIG. 2, operation of system 10 occurs as follows. Once snare member 100 is displaceably secured to a frame structure cross member 4 by collar member 200, and the snare member's loop portion 110 is fitted about the given article 1, the snare member's engagement portion 120 is displaced away from collar member 200. At the outset, snare member 100 displaces in its entirety with engagement portion 120, with loop portion 110 substantially encircling and closing about article 1 towards a noose-like constriction thereof. Continued displacement of engagement portion 120 beyond this point is accommodated by a resilient extension of bias portion 130, as indicated by the directional arrow 30. This resilient extension of bias member 130, in turn, applies a biasing force that tightens the constriction of article 1 by loop portion 110. The tightness of constriction may be adjusted by varying the extent of the engagement portion's displacement. Hooking engagement portion 120 onto a cross member 4 of the frame structure 2 then preserves the extension of bias member 130 and, thereby, maintains the tightening bias upon this constrictive capture of article 1.

Article 1 may, thereafter, be released very simply by unhooking engagement portion 120 from the given cross member 4 and permitting the resilient bias portion 130 to contract to its original length. That part of loop portion 110 which had been drawn through collar member 200 by the engagement portion's displacement is thus withdrawn back through collar member 200, and the constriction about article 1 is loosened. This permits article 1 to be freely removed, adjusted, or replaced.

Figure 4:
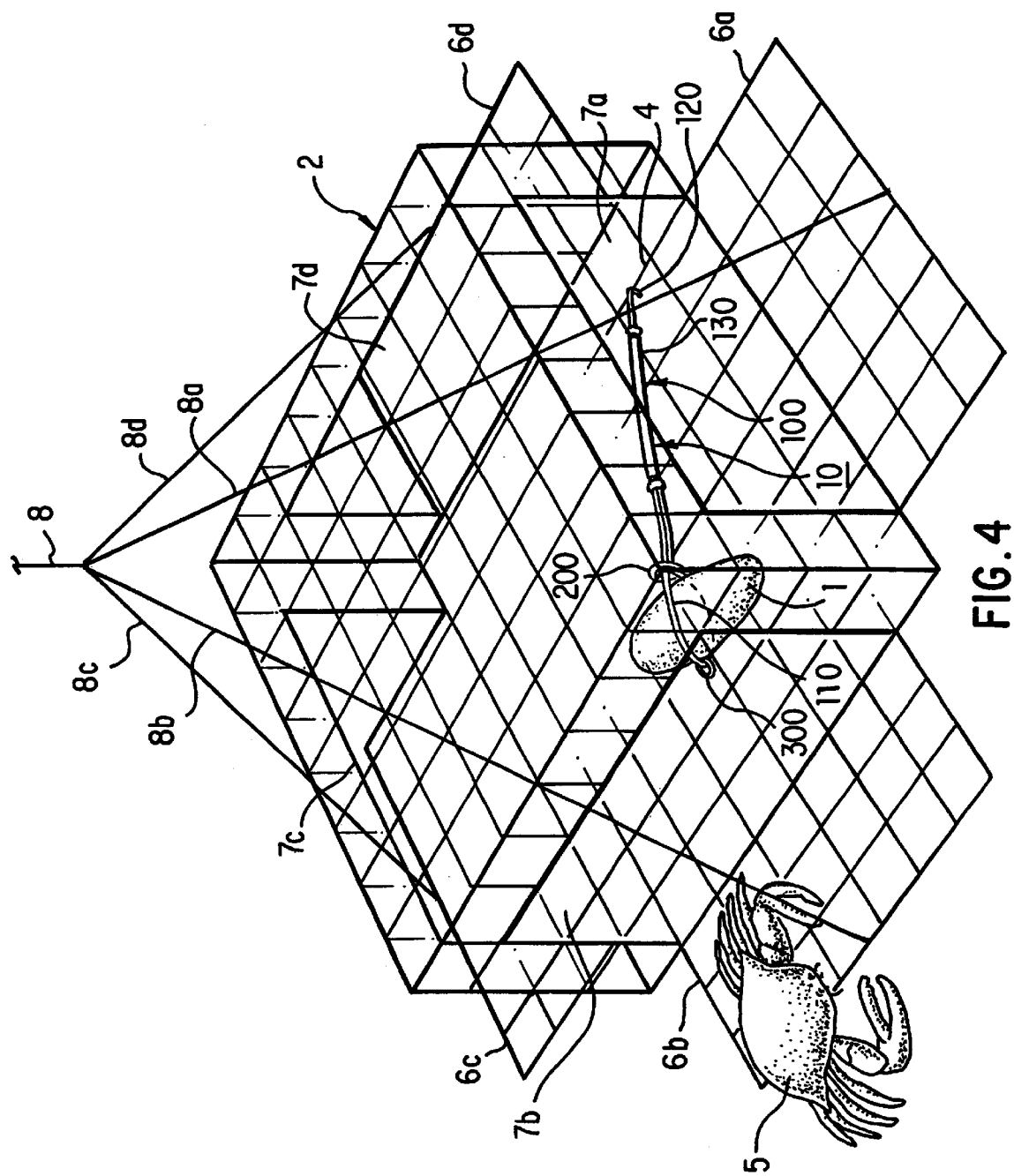

Turning now to FIG. 4, system 10 is shown during use in an exemplary application within a crab trapping context. As shown, snare member 100 is displaceably secured to a first cross member 4 on the bottom panel of the frame, or cage, structure 2. It is set as described in preceding paragraphs by resiliently displacing the snare member's engagement portion 120 to hook onto a second frame cross member 4 offset from the first cross member 4. The cage structure 2 is typically provided with a plurality of side access openings 7a, 7b, 7c, 7d by releasing respective trap doors 6a, 6b, 6c, 6d to their open positions. Draw lines 8a, 8b, 8c, 8d extending from a main draw line 8 are respectively connected to the trap doors 6a–6d.

A crab 5 may then freely enter the cage structure 2 upon sensing and detecting the bait item 1. System 10 accessibly yet securely retains the bait item 1 such that a crab 5 entering the cage structure 2 may consume it in place, but not remove it from the cage structure's compartment. The various portions of system 10 are formed of suitably strong and durable material that it may withstand the assault of even the most tenacious of crabs 5 to remove that bait item 1 from the cage structure 2. System 10 thus compels a crab 5 to remain within the frame structure 2 for a substantial time duration consuming the bait item 1.

This is particularly important in the given application, for an operator will often employ a plurality of the illustrated trap arrangements and only periodically check each individual arrangement for a successful catch. The longer a crab 5 is compelled to remain within the cage structure 2, therefore, the greater the likelihood of a successful catch.

A check of the illustrated trap arrangement is initiated by the operator's drawing the main draw line 8 upwards. This immediately causes draw lines 8a–8d to responsively draw trap doors 6a–6d to their closed positions and, thereby, trap what crabs 5 may be present within the cage structure's inner compartment. The operator may then, upon drawing the cage structure 2 from the water, retrieve any trapped crabs 5, disengage engagement portion 120 of snare member 100 from the cross member 4, replace or remove the bait item 1 if necessary, pull engagement portion 120 to draw loop portion 110 tightly about the bait item 1, then re-engage engagement portion 120 with the frame structure cross member 4. The operator would then again lower the trap arrangement onto the water's bottom surface for another trapping attempt.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of method steps may be reversed or interposed, all without departing from the spirit or scope of the invention as defined in the appended claims.

What is claimed is:

1. A system for releasably securing an article to a creature engagement frame structure comprising:
   (a) a collar member secured to the frame structure, said collar member substantially defining a hoop;
   (b) a snare member coupled to said collar member, said snare member including:
      (1) a collapsible loop portion displaceably captured by said collar member, said loop portion passing through said hoop;
      (2) an engagement portion for releasably engaging the frame structure; and,
      (3) an intermediate portion flexibly extending between said loop and engagement portions, said intermediate portion being tensed upon said engagement of said engagement portion to the frame structure to bias said engagement portion towards said loop portion;

whereby said loop portion is operatively drawn to constrictively collapse about the article responsive to sufficient displacement of at least a portion of said snare member relative to said collar member.

2. The system as recited in claim 1 wherein said engagement portion of said snare member is resiliently coupled to said loop portion thereof.

3. The system as recited in claim 2 wherein said loop portion of said snare member is formed of a flexible material.

4. The system as recited in claim 3 wherein said flexible material is substantially inelastic.

5. The system as recited in claim 3 wherein said intermediate portion is resilient.

6. The system as recited in claim 5 wherein said intermediate portion of said snare member includes an elastic section having an elongate contour.

7. The system as recited in claim 5 further comprising a catch member coupled to said loop portion of said snare member for impeding the release thereof from said coupling with said collar member.

8. The system as recited in claim 5 wherein said collar member is integrally formed of a malleable material, said collar member having opposed end portions disposed adjacent one another.

9. The system as recited in claim 8 wherein said catch member includes a ring portion engaging said snare member loop portion, said ring portion having an outer diametric dimension greater than a maximum inner diametric dimension of said hoop substantially defined by said collar member.

10. The system as recited in claim 5 wherein said engagement portion includes an end having a hook formed thereon.

11. An adjustable system for securing an article comprising:
   (a) a creature engagement frame assembly including at least first and second cross members spaced offset one from the other;
   (b) snare member displaceably coupled to said first cross member by a collar member, said snare member having a flexible loop portion, en engagement portion, and a resilient bias portion extending therebetween, said loop portion being adapted to substantially encircle the article, said bias portion being tensed to bias said engagement portion towards said loop portion upon said engagement portion engaging said second cross member; and
   (c) a catch member coupled to said snare member for impeding the release thereof from said coupling with said collar member;
   said loop portion being adapted for engaging the article in increasingly constrictive manner responsive to increasing displacement of said engagement portion relative to said collar member, said bias portion being adapted to releasably bias thereby said constrictive engagement of the article.

12. The system as recited in claim 11 wherein said loop portion is formed of a substantially inelastic material.

13. The system as recited in claim 12 wherein said bias portion of said snare member includes an elastic section having an elongate contour.

14. The system as recited in claim 13 wherein said engagement portion includes an end having a hook formation.

15. The system as recited in claim 13 wherein said catch member includes a ring portion engaging said snare member loop portion, said ring portion having an outer diametric dimension greater than a maximum inner diametric dimension of said collar member.

16. The system as recited in claim 15 wherein said collar member is integrally formed of a malleable material, said collar member having opposed end portions disposed adjacent one another.

17. A method of securing an article to a creature engagement frame assembly having a plurality of cross members in adjustable manner comprising the steps of:
   (a) providing a snare member having a flexible loop portion, an engagement portion, and an intermediate portion extending therebetween;
   (b) providing on said loop portion, a catch member secured thereto;
   (c) fastening a collar member about said flexible loop portion of said snare member and a first one of the frame assembly cross members to displaceably couple said snare member to the frame assembly;
   (d) positioning said flexible loop portion to substantially encircle the article;
   (e) displacing said engagement portion from said loop portion to tension said intermediate portion and to at least partially draw said loop portion through said collar member, said loop portion thereby constrictively engaging the article in adjustable manner responsive to said engagement portion displacement; and,
   (f) releasably securing said engagement portion to a second one of the frame assembly cross members to maintain said constrictive engagement of the article by said loop portion, said engagement portion being resiliently biased toward said loop portion.

18. The method as recited in claim 17 wherein said step of fastening said collar member includes malleably crimping said collar member captively about said loop portion of said snare member and the first frame assembly cross member, said collar member being configured to obstruct passage of said catch member therethrough.

19. The method as recited in claim 17 wherein said step of displacing said engagement portion from said loop portion includes expanding said intermediate portion therebetween.

20. The method as recited in claim 17 wherein said step of securing said engagement portion includes hooking said engagement portion to the second frame assembly cross member.

* * * * *